Aug. 4, 1970
J. R. NEWTON
3,522,896
LIFT TRUCK
Filed June 12, 1968
3 Sheets-Sheet 1
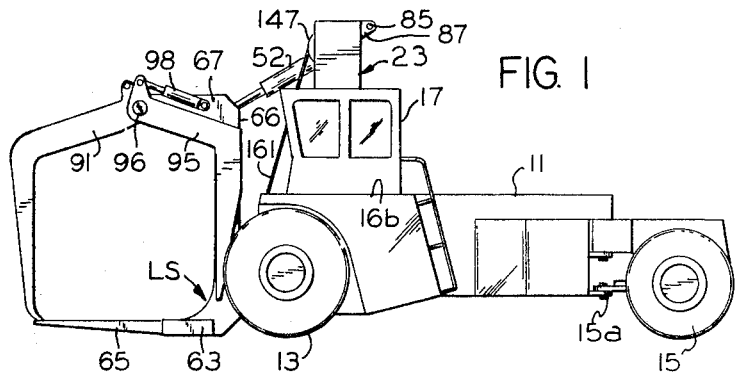
FIG. 1
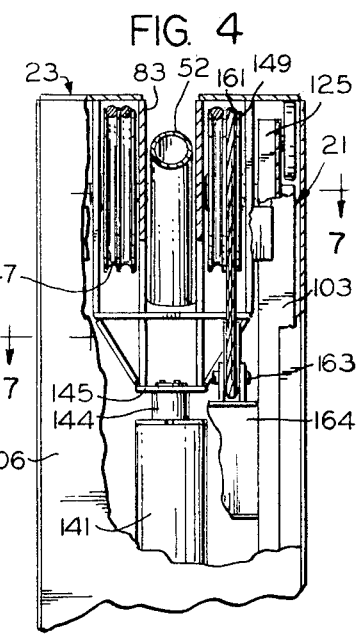
FIG. 4
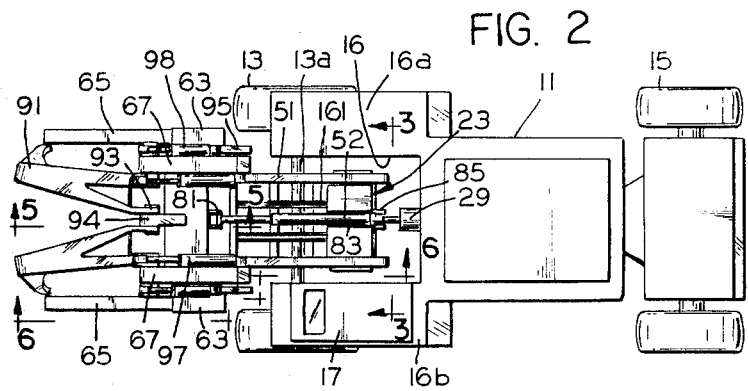
FIG. 2
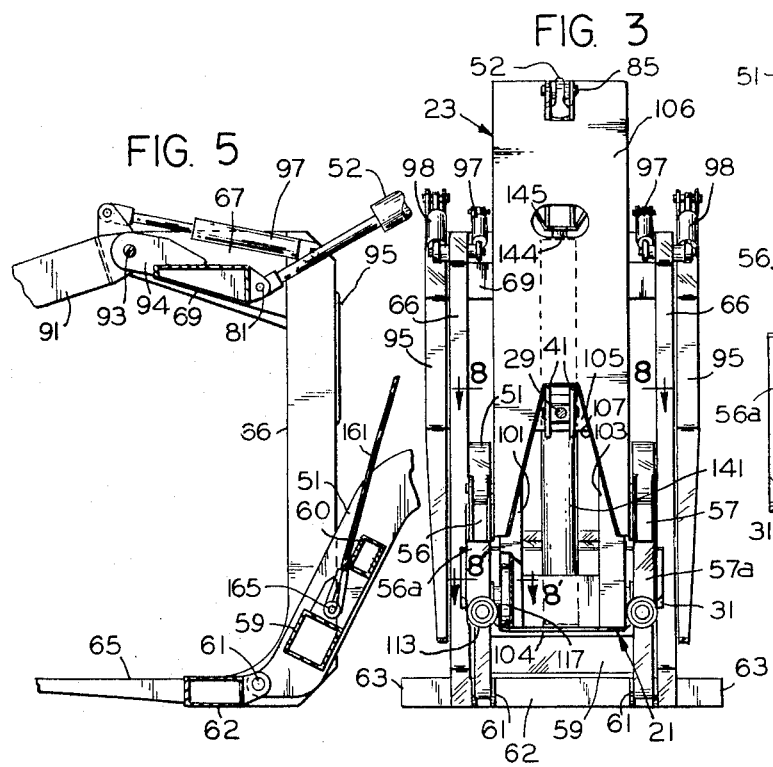
FIG. 3
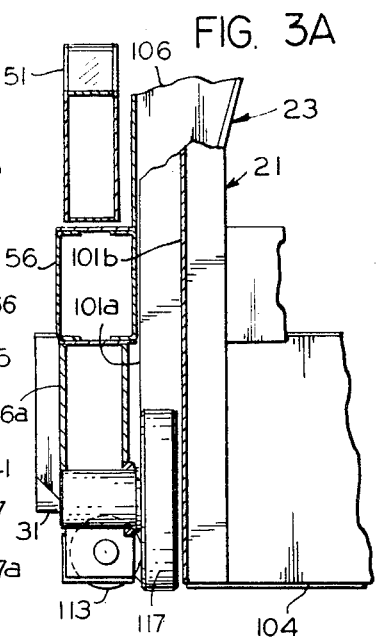
FIG. 3A
FIG. 5
JOHN R. NEWTON
INVENTOR
BY
BUCKHORN, BLORE, KLARQUIST & SPARKMAN
ATTORNEYS United States Patent Office 3,522,896
Patented Aug. 4, 1970

3,522,896
LIFT TRUCK
John R. Newton, 1001 Normandy Drive S.,
Salem, Oreg. 97302
Filed June 12, 1968, Ser. No. 736,364
Int. Cl. B66f 9/18
U.S. Cl. 214—652                                    4 Claims

ABSTRACT OF THE DISCLOSURE

A lift truck having a tiltable telescopic mast of tubular construction and located rearwardly of the front axle and alongside of the operator's station for improved visibility by the operator and better load stability. There is a load supporting carriage connected to the movable upright of the mast by a parallel linkage system whereby to maintain the carriage horizontal when the mast is extended and the carriage elevated relative to the movable upright.

BODY OF THE APPLICATION

The visibility of the operator in conventional lift trucks is poor because he is located rearwardly of the mast. In addition, since the mast is mounted forwardly of the front axle of the truck, the load capacity of the truck is not as great as desired for any particular size truck.

The truck of the present invention overcomes the above problems by providing a telescopic mast of tubular form located near, preferably rearwardly, of the front axle and by locating the driving station forwardly of its previous position and alongside the mast, thereby to improve driver visibility and to increase the capacity of the truck. I also connect the load carriage to the movable upright of the mast by a parallel linkage system which not only enhances visibility but also enables the carriage to be elevated to a higher level with a mast of given height than is possible with the carriage mounted by rollers on the mast.

The invention will be explained in connection with the accompanying drawings, wherein:

FIG. 1 is a side elevational view of a truck embodying the concepts of my invention;

FIG. 2 is a plan view of the truck;

FIG. 3 is a fragmentary vertical sectional view taken along line 3—3 of FIG. 2;

FIG. 3A is a fragmentary vertical sectional view on an enlarged scale, taken along line 3A—3A of FIG. 6;

FIG. 4 is an enlarged rear view of the upper portion of the mast structure with parts broken away and in section for convenience in illustration;

FIG. 5 is a fragmentary vertical sectional view taken along line 5—5 of FIG. 2;

Figure 7:
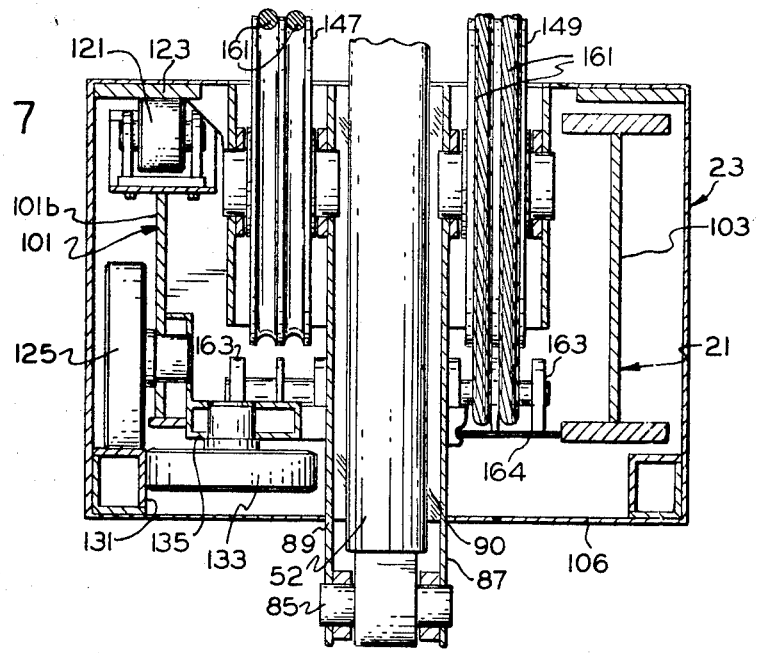
Figure 8:
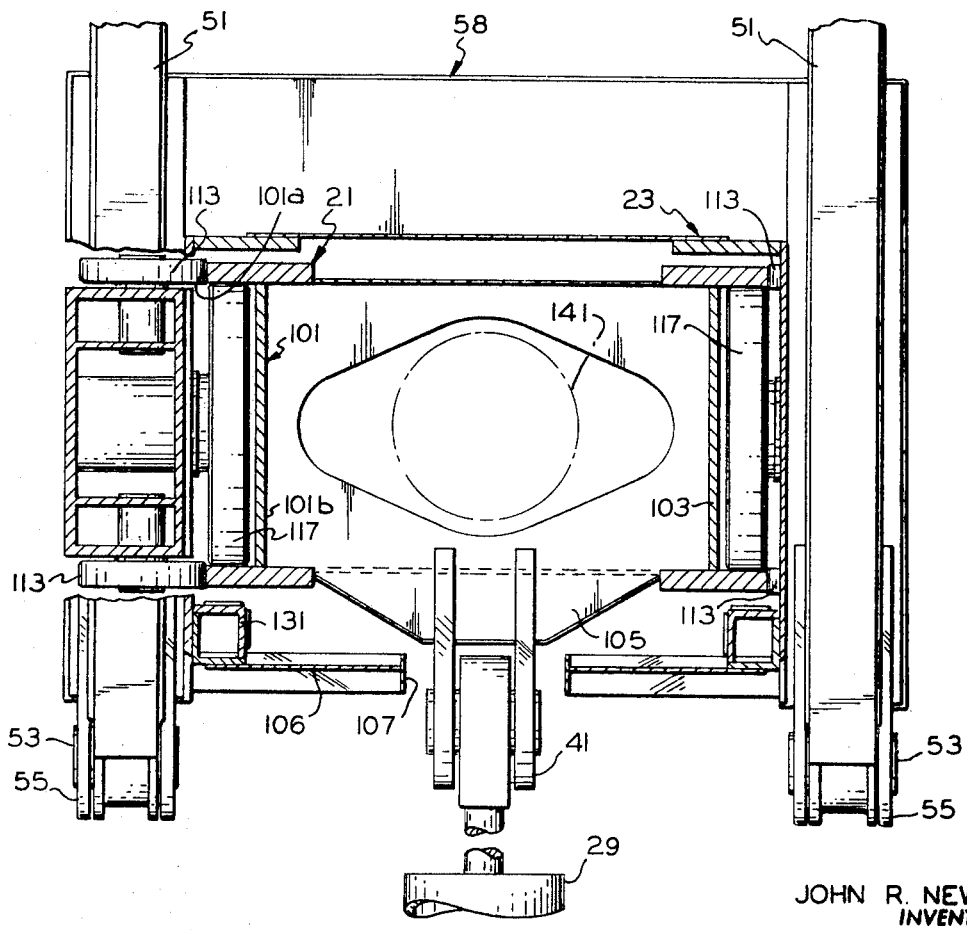

FIG. 7 is an enlarged horizontal sectional view taken along line 7—7 of FIG. 4; and FIG. 8 is an enlarged horizontal sectional view taken along line 8—8 of FIG. 3, with certain parts shown at the level 8'—8' of FIG. 3.

The lift truck shown includes a frame or chassis 11 supported by front wheels 13 having an axle 13a (FIG. 2) and steerable rear wheels 15 pivoted about pivots 15a (FIG. 1) under the influence of a conventional power mechanism (not shown). The frame 11 has a deep vertical recess 16 (FIG. 2) formed in its front end defined in part by forwardly projecting frame portions 16a and 16b. Thus, the cab is offset (FIG. 2) laterally of the and in particular mounted on the forward frame portion 16b. Thus, the cab is offset (FIG. 2) laterally of the centerline of the frame to clear a space for the location of the lifting mechanism of the truck.

The lifting mechanism includes a telescopic tubular mast unit which comprises a fixed inner member or upright 21 (FIG. 3) and a movable outer member or upright 23 (FIGS. 3 and 2). The inner upright is mounted for back and forth tilting movement by means of journal members 31 (FIG. 6), such movement being under the control of a tilt cylinder 29. The cylinder is pivotally connected (not shown) at its rear end to the frame 11, and is pivotally connected at its forward piston-rod end to ears 41 (FIGS. 6 and 8) which are fixedly secured to the inner upright 21. A conventional hydraulic circuit (not shown) is provided for the tilt cylinder 29, and includes a control valve by which the cylinder can be extended to tilt the mast unit forwardly or contracted to tilt the mast unit rearwardly.

Figure 6:
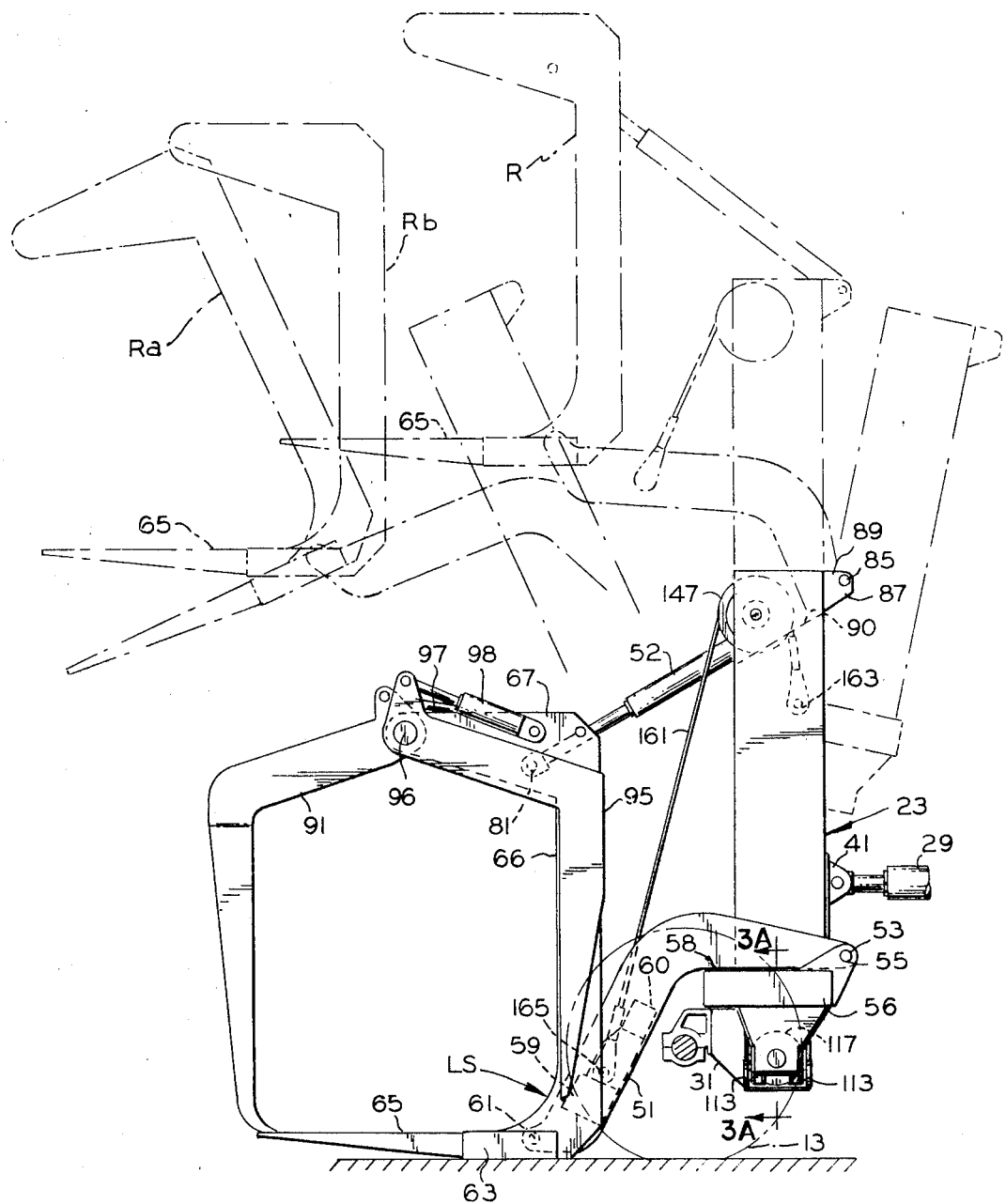
FIG. 6 is a fragmentary vertical sectional view taken along line 6—6 of FIG. 2.

The lifting mechanism includes a load engaging structure LS (FIG. 6) which is supported from the outer upright 23 by a parallel linkage. The linkage includes a pair of lower lift arms 51 (FIGS. 6 and 2) and a single upper cylinder 52. The lift arms are laterally spaced and are of reverse-curved form (FIG. 6). The arms are pivotally mounted at their rear ends by means of pivot shafts 53 on ears 55. The latter are fixedly secured to lateral depending offset extensions 56 and 57 of the outer movable upright 23. These extensions are the end portions of a U-shaped box structure 58 which comprises a rigid lower portion of the outer upright 23. Cross pieces 59 and 60 (FIG. 5) rigidly connect the forward portions of the lift arms 51 so that the arms move as a unit.

The front ends of the lift arms 51 are pivotally connected at 61 (FIGS. 5 and 6) to a cross member 62 of a load carriage in the form of a lift fork structure. The cross member 62 extends laterally beyond the lift arms 51 (FIG. 3) and at its ends has forwardly projecting fork arms sockets 63 (FIGS. 2 and 6). The latter carry removable fork arms 65.

The lift fork structure further has laterally spaced abutment standards 66 rigidly secured at their lower ends to the cross member 62 (FIG. 5). Mounting arms 67 are rigidly secured to the upper ends of the abutment standards 66 and extend forwardly therefrom. Arms 67 are rigidly connected together by a mounting piece 69 (FIG. 5).

The parallel linkage cylinder 52 (previously mentioned) has its forward piston-rod end pivotally connected at 81 (FIGS. 2 and 5) to the mounting piece 69. The cylinder extends rearwardly through a recess or notch 83 (FIGS. 4 and 7) formed in the upper end of the movable upright 23. The rear end of the cylinder is pivotally connected at 85 (FIG. 7) on a pair of ears 87. The ears are rearward extensions of spaced notch-defining plates 89, which together with an inclined bottom plate 90 define the notch or recess 83.

There are a pair of clamp arms 91 (FIGS. 5 and 6) having bifurcated upper ends, the inner portions of which are pivotally mounted at 93 (FIG. 5) to the front end of a mounting lug 94 on mounting piece 69. The outer portions are pivotally mounted to the arms 67. There are a pair of kicker arms 95 (FIG. 6) pivotally mounted at 96 on the forward portions of the mounting arms 67. A pair of cylinders 97 (FIG. 2) operate the clamp arms 91 and are pivotally connected between the upper bell crank ends of the clamp arms and the rear ends of the mounting arms 67. A pair of hydraulic cylinders 98 (FIGS. 2 and 6) operate the kicker arms 95, the cylinders 98 being connected between the upper bell crank ends of the kicker arms and the rear portions of the mounting arms 67.

FIGS. 2, 7 and 8 show that the inner upright 21 and the outer upright 23 are of generally hollow rectangular cross section and are shown as being fabricated of a number of parts.

The inner upright 21 can be considered as comprising a pair of spaced parallel upright beams 101 and 103 (FIG. 3) which are shown as being of I shape in cross section (FIGS. 7 and 8), although they could be channel-shaped. The beams 101 and 103 are connected together at spaced places along their lengths by various cross members and by a bottom member 104 (FIG. 3). One of the cross members 105 is shown in FIGS. 3 and 8, and carries the ears 41 to which the front piston-rod end of the tilt cylinder 29 is connected.

The outer upright 23 has a rear wall plate 106 (FIG. 3) which is cut out at 107 to accommodate the ears 41 and the cylinder 29 in the lowered position of the outer upright.

There is a roller guiding arrangement between the inner and outer uprights at their lower ends (wherein the rollers are carried by the outer uprights) and there is a roller guiding arrangement between the inner and outer uprights at their upper ends (wherein the rollers are carried by the inner uprights). The lower guiding arrangement will be described first, and includes rollers (to be described) which are mounted on extensions 56a and 57a (FIGS. 3 and 3A) which depend from extensions 56 and 57 (previously mentioned) of the outer mast 23. Since the rollers mounted on one extension are the same as mounted on the other extension, only those mounted on extension 56a will be described. This guiding arrangement includes a pair of guide rolers 113 (FIGS. 3 and 8) which rollingly engage the free edges of the outer flanges 101a of the beam 101 of the inner upright 21. The guide rollers 113 are rotatable about axes which extend longitudinally of the truck.

Extension 56a also carries a single larger diameter guide roller 117 which is disposed between the outer flanges 101a of the beam 101 and rides against the inner surface of the rearward flange. The roller 117 is mounted for rotation about a transverse axis.

The upper roller arrangements are identical so only the left one (as the parts are shown in FIG. 7) will be described. The left roller arrangement includes a front roller 121 which is mounted in a recess formed in the beam 101 and rolls against the guide plate 123 which forms part of the outer upright 23. There is also a roller 125 mounted on the reinforced web 101b of the beam 101 and rolling against the front face of a corner post 131. The post is part of the outer upright 23. There is a further roller 133 mounted on a bracket structure 135 and rollingy engaging the inner face of the post 131.

When the outer mast is elevated (by means to be presently described), the lower rollers roll along the exterior of fixed inner upright while the upper rollers roll against the interior of the outer upright. Thus, the outer upright is properly guided for vertical movement along the inner upright.

The elevating mechanism includes a hydraulic ram 141 (FIG. 3) which is contained within the inner upright (FIG. 8) and is mounted on the bottom cross member 104 (FIG. 3) of the inner upright. The ram extends upwardly and has its plunger 144 (FIG. 4) secured to a bracket structure 145 which is fixed to the interior of the outer upright 23. The bracket structure 145 carries two pairs of sheaves 147 and 149. The sheaves are contained within and rotatably supported by the bifurcated upper end of the inner upright.

The sheaves 147 and 149 and structure 145 leave space to accommodate the upper ends of the inner upright beams 101 and 103 (FIG. 4).

Two pairs of lift cables 161 (FIG. 6) are trained over the sheaves 147 and 149 and are secured at one set of ends to anchor devices 163 (FIG. 4). The devices are rigidly mounted interiorly on a cross piece 164 on the upper end of the inner upright. The other set of ends of the lift cables 161 are anchored at 165 to the cross member 59 (FIGS. 5 and 6) of the lift arms 51.

Referring to FIGS. 4 and 6, as the ram 141 is extended, the plunger 144 thereof lifts the outer mast 23 at a 1–1 rate, and, through the sheaves 147 and 149 and the cables 161, lifts the load engaging structure LS at a rate which is 2–1 at the anchor points 165 but more than 2–1 at the pivot points 61, as is evident by a comparison of the full and dotted lines in FIG. 6.

If it is assumed that it is desired to raise the load carriage upwardly to the position labeled R in FIG. 6, the tilt cylinder 29 will remain unenergized, and the cylinder 52 will be locked against extension and contraction. Thus, the lift arms 51 and the cylinder 52 will act as parallel links and maintain horizontal the position of the load arms 65 as the carriage is raised. Of course, the operator has many options at his disposal in operating the equipment and may want to tilt the load mast rearwardly or even forwardly. These operations need not be described in detail.

If it is assumed that the carriage has been raised to the R position in FIG. 6, and that it is desirable to tilt the mast forwardly, the tilt cylinder 29 will be energized to perform this operation to tilt the mast and the load carriage to the Ra position in FIG. 6. Either before, during or after this forward tilting movement, the cylinder 52 could be actuated to tilt the carriage structure to positions different from the Ra position in FIG. 6, this being another option available to the operator. It may even be desirable to elevate the load carriage to the R position, to tilt the mast forwardly and maintain the fork arms 65 horizontal. If this is to be done, controlled contraction of the cylinder 52 could be effected to thereby dispose the carriage at the Rb position in FIG. 6. It is distinctly pointed out that FIG. 6 shows only a few of the many possible positions of the load carriage and related structure, and such positions are merely exemplary and are in no way limiting. It would be impractical to attempt to show all the various operations which could be performed by selective operation of the elevating ram 141, the tilt cylinder 29 and the link cylinder 52.

If it is assumed that the load on the carriage is to be discharged with the aid of the kicker arms 59, the cylinders 97 would be actuated to swing the clamp arms 91 outwardly and upwardly to a "clearing" position prior to actuating the cylinders 98, which, when actuated, would thrust the kicker arms 95 forwardly.

An important structural feature of my lift truck is the capability of the mast to take substantial torsional loading, particularly because of the deep dimension of the tubular mast structure in a direction longitudinally of the truck. In fact, I contemplate making the mast strong enough so that even though an elongate load were securely held in the load carriage and the end of the load were to engage a rigid structure while the truck was moving, the mast would not fail, and instead would cause the rear end of the truck to skid around.

While FIGS. 1 and 2 show the truck body with a pivoted rear section, this is obviously merely a matter of illustration, and the rear wheels could be conventionally mounted on a single unit body, if desired, or in any other way.

While the particular truck shown has only a single upper cylinder 52, a pair of cylinders could be employed, mounted one on either side of the outer upright. In addition, if forward tilting movement of the load engaging structure LS is not required, or desirable, the cylinder 52 could be replaced by a single non-extensible link, or if desired, by a pair of links disposed one on either side of the outer upright.

While the truck shown is equipped for handling elongate items such as logs, this is merely illustrative, and the load carriage may take any desired form.

It is believed that the concepts of the present invention will find greatest utility in large capacity lift trucks.

By way of example, and not by way of limitation, it is contemplated that one of the first trucks to be built will be in the 70,000 to 80,000 pound capacity range.

I claim:
1. A lift truck comprising:
   a wheel supported frame,
   an extensible mast on said frame including at least one movable mast section,
   a load engaging structure forwardly of said mast,
   parallel linkage means connecting said load engaging structure to said movable mast section,
   and common means for elevating said movable mast section relative to said frame, and for swinging said load engaging structure relative to said movable mast section.
2. A lift truck as set forth in claim 1, wherein said frame has front wheels and rear wheel means and axle means for said front wheels,
   said frame having laterally spaced frame portions defining a vertical recess at the front end of said frame extending rearwardly of said axle means,
   said axle means being mounted on said spaced frame portions,
   and said mast being mounted in said recess with the centerline of said mast located rearwardly of the centerline of said axle means,
   said parallel linkage means including a pair of lower links disposed one on either side of said mast and pivotally mounted on said movable mast member and extending forwardly over said axle means and then downwardly to dispose said lift structure in contiguous relation to ground level when said movable mast section is in its down position,
   and a driver's station located on one of said frame portions alongside said mast.
3. A lift truck as set forth in claim 2 in which there is a cross member between the lower links adjacent the forward end thereof,
   said elongate flexible means being anchored at said opposite ends to said cross member.
4. A lift truck as recited in claim 1 wherein said common means comprising a hydraulic lift cylinder connected to said movable mast section,
   said common means including reaving means on said movable mast section,
   and elongate flexible means reaved over said reaving means and connected at one end to a non-elevatable portion of said mast and at its opposite end to said parallel linkage means.

References Cited
UNITED STATES PATENTS

| | | | |
|---|---|---|---|
| 2,780,377 | 2/1957 | Glenn | 214—620 X |
| 3,018,011 | 1/1962 | Ackerman | 214—146.5X |
| 3,045,850 | 7/1962 | Carr | 214—620 |
| 3,319,813 | 5/1967 | Beyea. | |

FOREIGN PATENTS

| | | |
|---|---|---|
| 1,392,006 | 2/1965 | France. |

GERALD M. FORLENZA, Primary Examiner

G. F. ABRAHAM, Assistant Examiner

U.S. Cl. X.R.

214—146.5, 654, 660

UNITED STATES PATENT OFFICE
CERTIFICATE OF CORRECTION

Patent No. 3,522,896                      August 4, 1970

John R. Newton

It is certified that error appears in the above identified patent and that said Letters Patent are hereby corrected as shown below:

Column 1, after line 69 insert -- 16b. There is a cab 17 located at the front of the frame and in particular mounted on the forward frame portion --.

Signed and sealed this 20th day of October 1970.

(SEAL)
Attest:

Edward M. Fletcher, Jr.                WILLIAM E. SCHUYLER, JR.
Attesting Officer                            Commissioner of Patents